June 4, 1940.  N. GOODWIN  2,203,614
PROCESS FOR MAKING MAGNESIUM SILICATE PRODUCTS
Filed May 6, 1930
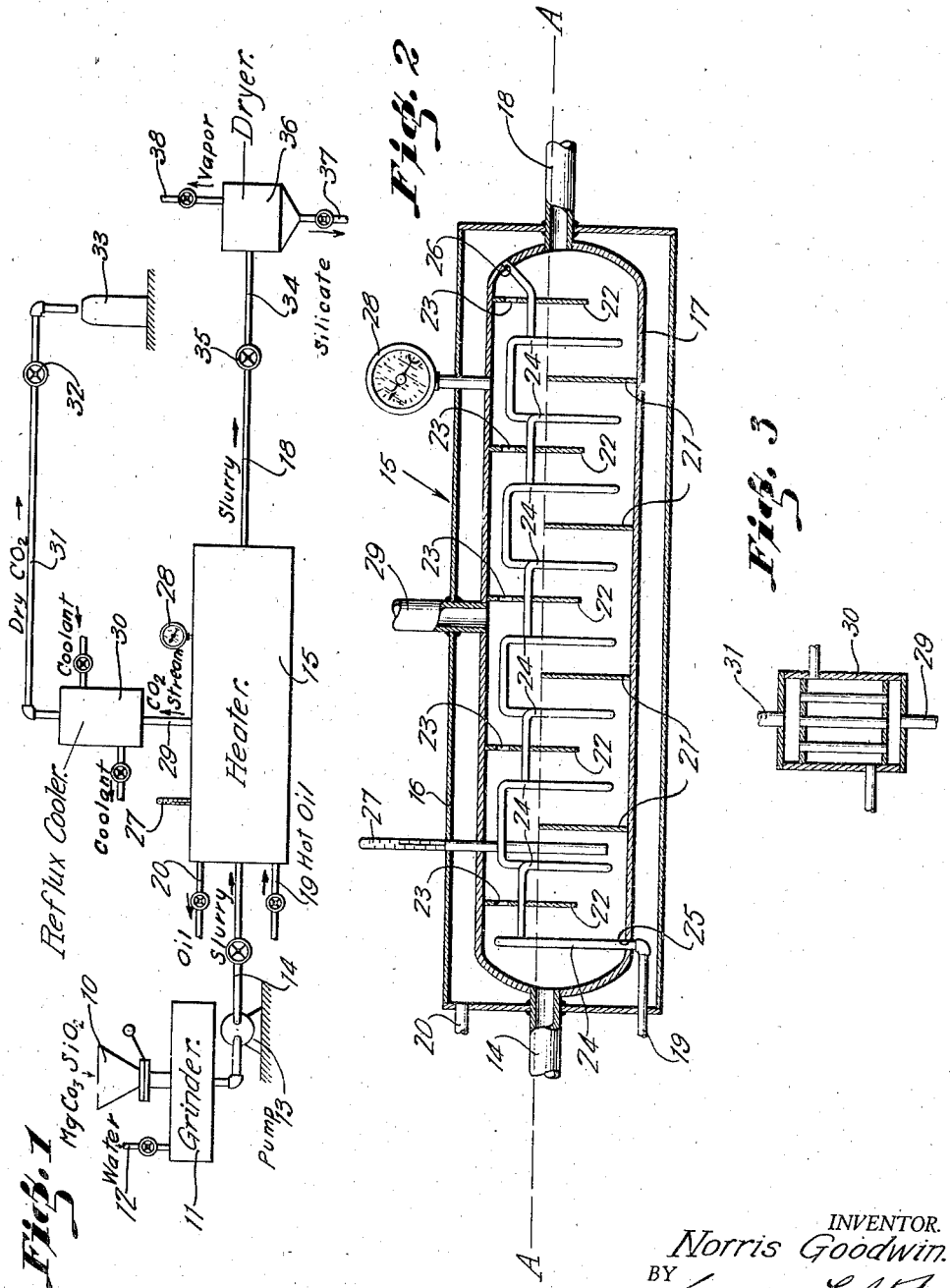
INVENTOR.
Norris Goodwin.
BY Charles L. Stokes
ATTORNEY Patented June 4, 1940

2,203,614

UNITED STATES PATENT OFFICE 2,203,614

PROCESS FOR MAKING MAGNESIUM SILICATE PRODUCTS

Norris Goodwin, Long Beach, Calif., assignor, by mesne assignments, to Hewlings Mumper and Lewis Cruickshank, Los Angeles, Calif.

Application May 6, 1930, Serial No. 450,155

5 Claims. (Cl. 23—110)

This invention relates to a process of treating natural magnesium carbonate-containing minerals with silica, and has for its principal object the production of carbon dioxide in large quantities in a simple, novel and highly efficient manner, as well as the production of magnesium silicate in essentially colloidal form which may be valuable as a pigment, or as a filler for rubber, or wherever a finely divided, surface reactive, material may be applicable.

A further object is to produce a magnesium silicate bleaching material by a process which yields pure carbon dioxide.

It has long been desirable to produce carbon dioxide ($CO_2$) by the calcination of magnesite ($MgCO_3$) in a closed retort and many attempts have been made to do so in a commercial way, but all such attempts have heretofore failed due to the fact that when magnesite ($MgCO_3$) is heated sufficiently to give off $CO_2$, an equilibrium is established in the reaction as follows:

$$MgCO_3 \rightleftarrows MgO + CO_2$$

It will be noted that the reaction proceeds in both directions and is never complete in the direction from left to right as long as the reaction is carried out in an atmosphere of $CO_2$, due to partial pressure effects and the greater the partial pressure of $CO_2$ in the reaction vessel, the less complete will be the reaction from left to right.

The effect of this is that all attempts to produce $CO_2$ by this reaction have resulted not only in the incomplete production of $CO_2$, but also in the production of MgO which is not marketable due to sever contamination with $MgCO_3$. On the other hand by the present process, not only is substantially 100% of the $CO_2$ present in the raw material ($MgCO_3$) taken off and recovered, but a high grade material useful for bleaching or other purposes, is likewise recovered. This is accomplished by utilizing the reactivity of silicic acid under heat and pressure, which reaction may be roughly represented in a typical manner as follows:

$$MgCO_3 + SiO_2 + H_2O = \text{magnesium silicate} + CO_2$$

The correct formula for the silicate thus formed is not definitely known, but it is probably in a hydrated form. The reaction is essentially complete from left to right and is common to all magnesium carbonates when proper temperature and pressure conditions are used.

Magnesium silicates formed by the above reaction are in a finely divided colloidal condition and have important uses as pigments, catalysts, adsorptive agents, bleaching material, heat insulators, emulsifiers, and may in fact be used wherever finely divided colloidal materials can be applied in various arts.

With reference to the drawing, in which Fig. 1 is a diagrammatic flow sheet, Fig. 2 is a longitudinal vertical section of a heater, and Fig. 3 is a vertical sectional view of a cooler, the natural magnesium carbonate containing material, such as magnesium carbonate, hydrated magnesium carbonate, basic magnesium carbonate, or the like, together with siliceous material, such as diatomaceous earth, quartz, opaline silica, or the like, is supplied through a hopper 10 into any well known form of grinder 11, such as a ball mill, or the like, water being added through a pipe 12.

The grinding operation is contained until a slurry is former in which the magnesium carbonate-containing mineral is reduced to a particle size not greater than 100 mesh, and preferably to a size such as to pass through a 300 mesh screen, which slurry is forced by a pump 13 through pipe 14 into a heater 15.

The size to which the carbonate containing mineral is reduced depends on the reactivity of the same and on the subsequent temperature and pressure used as well as the time of application. The finer the material is ground, the more surface is available for reaction and therefore less time, temperature and pressure will be required to complete the reaction.

Heater 15 has an outer shell 16 and an inner shell 17, inlet pipe 14 being welded, or otherwise securely fixed to shells 16 and 17, outlet pipe 18 being fastened thereto in like manner. An inlet pipe 19 and an outlet pipe 20 provide for the continuous introduction and discharge of a heating medium, such as hot oil, between and through shells 16 and 17 whereby the reaction temperatures and pressures are produced in the slurry in shell 17. Shell 17 has a series of vertical transverse baffles 21, the tops of which extend to about a desired fluid level A—A which preferably maintains inlet pipe 14 and outlet pipe 18 full of the slurry, and a series of depending transverse baffles 22, the bottom edges of which extend below said fluid level, baffles 22 being provided each with an orifice 23 for the passage of gas for pressure equalization.

A series of pancake pipe coils 24 serves to pass the heating medium throughout the interior compartments formed by the baffles in shell 17 by means of an inlet 25 and a discharge 26 for heating the slurry. The temperature of the slurry is indicated by a pyrometer 27 and the pressure by a gage 28, and carbon dioxide and steam pass out of pipe 29 to a reflux refrigerator, or condenser 30, wherein any steam is condensed to fall back into shell 17, while the dry carbon dioxide will pass through pipe 31 and regulating valve 32 to be stored in container 33.

The magnesium silicate and water will pass through pipe 18, regulating valve 35, and pipe 34 into a dryer 36 whence the dried silicate may be withdrawn through pipe 37 while vapor will pass out of pipe 38.

In operation, depending on the raw carbonate used, or the metal silicate desired therefrom for any particular purpose, the pressure and corresponding temperature of steam at that pressure, in shell 17 will be regulated to the end desired. For instance, in using magnesite ($MgCO_3$) as a raw material, pressures of from 500 pounds up to 1000 pounds per square inch, or higher, are highly desirable, inasmuch as the carbon dioxide will be completely driven off in the reaction yielding a magnesium silicate having highly advantageous bleaching properties. Pressures as low as 150 pounds per square inch may be used, but the reaction period is then so slow as to be entirely uncommercial inasmuch as the time required to complete the reaction will be beyond commercial limits and the course of the reaction from left to right as indicated above will not approach completion. On the other hand the high pressures not only give the desired speed of reaction, but give a conversion entirely unknown before.

A certain amount of agitation may be desirable in shell 17 and this is provided by the spacing of baffles 21 and 22 in accordance with the velocity of the flow of the slurry, but other well known forms of mechanical agitators may be provided as well. Hence, it will be clear that the slurry, or mixture of finely ground materials with water or aqueous fluid, is maintained from pump 13 through heater 15 to regulating valve 35, and consequently the steam in heater 15 must be saturated steam at a temperature in excess of 212° F. at any superatmospheric pressure employed.

It is, of course, obvious that the carbon dioxide may be passed under its self-generated, or autogenous, pressure from the line 31 into the containers, or steel cylinders 33, of which there may be a plurality thus effecting a large saving and efficiency over known methods of storing gases under pressure wherein a compressor and extra equipment must be used.

The process is obviously designed for continuous operation due to the fact that pump 13 continuously forces the slurry into shell 17 where its temperature under a desired pressure is maintained by the continuous introduction and discharge of the heating medium to and from pipes 19 and 20 while baffles 21 serve to agitate the slurry in accordance with its velocity through shell 17. The velocity of the slurry depends on the speed of pump 13 in operating against the pressure controlled by regulating valves 32 and 35, regulating valve 35 being opened a sufficient amount to permit the continuous passage of a mixture of the magnesium silicate and water through pipe 18 at the desired fluid level A—A, while regulating valve 32 takes off the desired continuous stream of $CO_2$. Thus it will be apparent to one skilled in the art that the only way of maintaining the process at a desired pressure is by the continuous introduction of a slurry by pump 13 to shell 17 at a given temperature and pressure, the continuous supply of the heating fluid at a given temperature, and the continuous withdrawal through pipe 18 of a mixture of magnesium silicate and water which is unvaporized at the given pressure as well as the continuous withdrawal of $CO_2$ through pipe 31; said pressure being initially controlled by regulating valves 32 and 35.

I claim as my invention:

1. A process for making a magnesium silicate product which comprises grinding a natural magnesium carbonate-containing mineral substance to a particle size not greater than about 300 mesh and heating the finely divided mineral substance with finely divided silica and water in the form of a slurry at a temperature equivalent to a steam pressure greatly in excess of 150 pounds per square inch and not substantially below the neighborhood of 500 pounds per square inch until at least a major portion of the carbon dioxide content of the magnesium carbonate in said mineral substance is eliminated and at least a major portion of the magnesia content of said magnesium carbonate is converted to magnesium silicate.

2. A process for making a magnesium silicate product which comprises grinding a natural magnesium carbonate-containing mineral substance to a particle size not greater than about 300 mesh and heating the finely divided mineral substance with finely divided silica and water in the form of a slurry at a temperature equivalent to a steam pressure of at least about 500 pounds per square inch until at least a major portion of the carbon dioxide content of the magnesium carbonate in said mineral substance is eliminated and at least a major portion of the magnesia content of said magnesium carbonate is converted to magnesium silicate.

3. A process for making a magnesium silicate product which comprises grinding a natural magnesite to a particle size not greater than about 300 mesh and heating the finely divided magnesite with finely divided silica and water in the form of a slurry at a temperature equivalent to a steam pressure greatly in excess of 150 pounds per square inch and not substantially below the neighborhood of 500 pounds per square inch until at least a major portion of the carbon dioxide content of the magnesite is eliminated and at least a major portion of the magnesia content of the magnesite is converted to magnesium silicate.

4. A process for making a magnesium silicate product which comprises grinding a natural magnesite to a particle size not greater than about 300 mesh and heating the finely divided magnesite with finely divided silica and water in the form of a slurry at a temperature effective to produce a pressure of from about 500 to 1000 pounds per square inch until at least a major portion of the carbon dioxide content of the magnesite is eliminated and at least a major portion of the magnesia content of the magnesite is converted to magnesium silicate.

5. A process for making a magnesium silicate product which comprises grinding a natural magnesium carbonate-containing mineral substance to a particle size not greater than about 300 mesh, heating the finely divided mineral substance with finely divided silica and water in the form of a slurry at a temperature equivalent to a steam pressure greatly in excess of 150 pounds per square inch and not substantially below the neighborhood of 500 pounds per square inch and removing carbon dioxide during said heating until at least a major portion of the carbon dioxide content of the magnesium carbonate in said mineral substance is eliminated and at least a major portion of the magnesia content of said magnesium carbonate is converted to magnesium silicate.

NORRIS GOODWIN.